United States Patent
Lesche

(10) Patent No.: US 8,250,946 B2
(45) Date of Patent: Aug. 28, 2012

(54) PARKING BRAKE FOR A VEHICLE

(75) Inventor: Klaus Lesche, Kirchberg (DE)

(73) Assignee: Edscha Betaetigungssysteme GmbH, Hengersberg (DE)

(*) Notice: Subject to any disclaimer, the term of this patent is extended or adjusted under 35 U.S.C. 154(b) by 947 days.

(21) Appl. No.: 11/793,971

(22) PCT Filed: Dec. 14, 2005

(86) PCT No.: PCT/DE2005/002247
§ 371 (c)(1),
(2), (4) Date: Jun. 25, 2007

(87) PCT Pub. No.: WO2006/066546
PCT Pub. Date: Jun. 29, 2006

(65) Prior Publication Data
US 2008/0115617 A1 May 22, 2008

(30) Foreign Application Priority Data
Dec. 24, 2004 (DE) .......................... 10 2004 062 575

(51) Int. Cl.
*B60T 7/08* (2006.01)
*B60T 7/04* (2006.01)
(52) U.S. Cl. ............ 74/540; 74/539; 74/542; 74/577 SF
(58) Field of Classification Search ......... 74/501.6, 74/512, 529, 535, 537, 539–542, 575, 577 R, 74/577 SF, 523, 526, 536, 577 S
See application file for complete search history.

(56) References Cited

U.S. PATENT DOCUMENTS

| | | | | |
|---|---|---|---|---|
| 3,002,394 A | * | 10/1961 | Spisz | 74/152 |
| 3,211,269 A | * | 10/1965 | Emig | 400/332 |
| 3,484,831 A | * | 12/1969 | Higuchi | 403/103 |
| 3,648,541 A | * | 3/1972 | Hybarger et al. | 74/540 |
| 4,364,284 A | * | 12/1982 | Tani et al. | 74/540 |
| 4,441,380 A | * | 4/1984 | Kawaguchi et al. | 74/512 |
| 4,591,207 A | * | 5/1986 | Nithammer et al. | 297/366 |
| 4,770,463 A | * | 9/1988 | Nishino | 297/367 R |
| 4,872,368 A | * | 10/1989 | Porter | 74/542 |
| 5,211,072 A | * | 5/1993 | Barlas et al. | 74/512 |
| 5,775,174 A | | 7/1998 | Kanbe et al. | 74/542 |
| 6,105,459 A | * | 8/2000 | Troiano | 74/542 |
| 6,508,341 B1 | | 1/2003 | Hiura | 188/265 |
| 6,817,264 B2 | | 11/2004 | Hiura et al. | 74/512 |

FOREIGN PATENT DOCUMENTS

| | | |
|---|---|---|
| DE | 203 15 627 | 12/2003 |
| EP | 0 744 328 | 11/1996 |
| EP | 1 258 405 | 11/2002 |
| JP | 07257333 | 10/1995 |
| JP | 10024814 | 1/1998 |

* cited by examiner

*Primary Examiner* — James Pilkington
*Assistant Examiner* — Thomas Diaz
(74) *Attorney, Agent, or Firm* — Davidson, Davidson & Kappel, LLC

(57) ABSTRACT

A vehicle, comprising a brake operating lever, mounted to pivot on a lever bracket, a coupling unit, which couples a brake cable to the brake operating lever, a locking device with teeth and a locking bolt, tensioned against the teeth by means of a first spring element and a release unit, with at least one first lever, said locking bolt and the first lever having an articulation. A parking brake which permits a secure braking and release and also avoids making noise on operation and on releasing may be achieved, whereby the articulation for the locking bolt and the first lever is arranged on the lever bracket and the articulation is provided on the lever bracket in a displaceable manner.

19 Claims, 1 Drawing Sheet

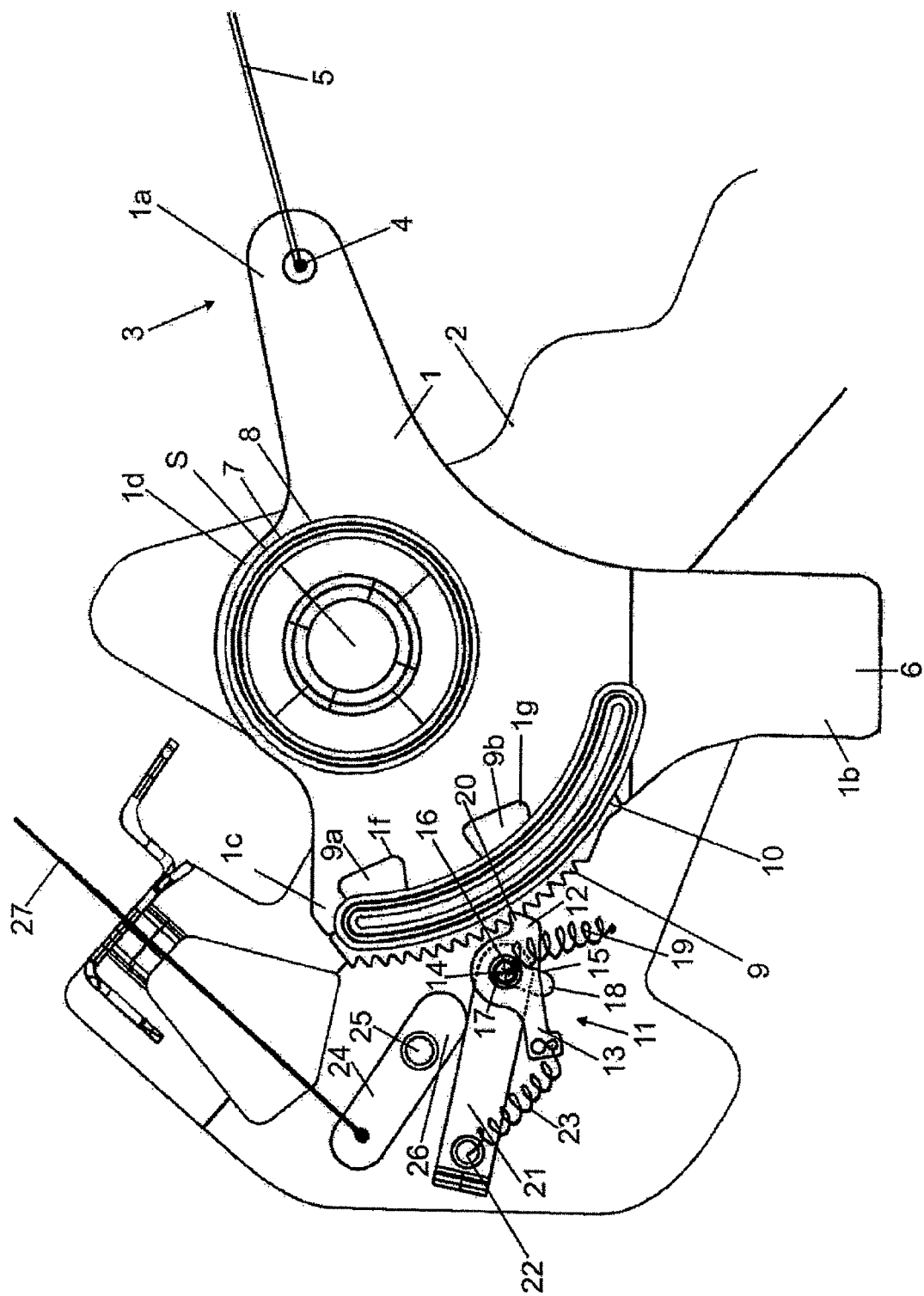

PARKING BRAKE FOR A VEHICLE

The invention relates to a parking brake for a vehicle, comprising a brake actuation lever which is mounted pivotably on a lever holder, a coupling unit which couples a brake cable to the brake actuation lever, a locking device having a toothing system and a locking pawl which is prestressed onto the toothing system by means of a first spring element, and a release unit which comprises at least one lever, the locking pawl and the lever having a common bearing.

EP 0 744 328 A1 shows a parking brake for a vehicle, in which an actuation lever which is configured as a hand brake lever is mounted on a lever holder such that it can pivot about a pivot axis, a brake cable being arranged on the brake actuation lever. A locking apparatus for locking the brake actuation lever on the lever holder comprises a toothing system which is arranged on the lever holder and a pivotably provided locking pawl which is connected pivotably to the brake actuation lever by means of a first lever. The locking pawl is prestressed against the toothing system by a spring element, the spring element being arranged on one side on the locking pawl and on the other side on the brake actuation lever. At the connection of the first lever to the locking pawl, a thrust rod acts on the toothing system in order to release the locking pawl. A disadvantage of this type of parking brake is the fact that, during actuation of the brake actuation lever, that is to say during pivoting about the pivot axis, the locking pawl is pivoted counter to the spring force of the spring element, in order to slide over the toothing system; pronounced noise development occurs here.

DE 203 15 627 U1 shows a parking brake for a vehicle, in which a brake actuation lever is configured as a hand brake lever which is mounted pivotably on a lever holder. A locking device for locking the brake actuation lever on the lever holder is formed by a locking pawl which is arranged pivotably on the brake actuation lever and engages into the toothing system which is arranged on the lever holder. In order to release the locking pawl from the toothing system, a release unit is provided which comprises a first lever which has a common bearing on the brake actuation lever with the locking pawl. A pin which is provided such that it can be displaced in a slot which is arranged on the locking pawl is arranged on the first lever. A disadvantage of this type of parking brake is that the locking pawl is subjected by the pivotable bearing on the brake actuation lever to a pivoting movement which causes sudden release of the locking pawl from the toothing system. The spring element is prestressed in the direction of the toothing system, such that friction is developed during a movement of the locking pawl between the latter and the toothing system, with the result that there is pronounced noise development during the release operation as a result of the suddenly occurring relative movement of the locking pawl with regard to the toothing system.

SUMMARY OF THE INVENTION

An object of the present invention is to provide a parking brake for a vehicle, which parking brake makes reliable locking and release possible and at the same time avoids noise development both during actuation and during release.

In accordance with a preferred embodiment of the present invention, a parking brake for a vehicle comprises a brake actuation lever being mounted pivotably on a lever holder, a coupling unit coupling a brake cable to the brake actuation lever, a locking device having a toothing system and a locking pawl being prestressed onto the toothing system by means of a first spring element, and a release unit having a first lever. The locking pawl is pivotably mounted in an articulation on the first lever, the first lever being rotatably received on the lever holder and the articulation being displaceably provided in a guide on the lever holder.

The displaceability according to the invention of the articulation of the locking pawl and the first lever makes it possible that the articulation has different positions on the lever holder, a first position being assigned to locking of the locking pawl in the toothing system and a second position being assigned to release of the locking pawl from the toothing system.

In a nonactuated position of the brake actuation lever, the displaceably provided articulation of the locking pawl may be provided in a first position on the lever holder. By pivoting, the brake actuation lever may be pivoted into an actuated position, the articulation of the locking pawl remaining in the first position, such that the locking pawl engages reliably into the toothing system in order to lock the brake actuation lever on the lever holder.

The provision according to the present invention of a displaceable articulation of the locking pawl and the lever on the lever holder achieves a situation where the articulation of the locking pawl may be displaced into a second position for release from the toothing system, such that there may be a linear movement of the locking pawl. This therefore results in a superimposition of the pivoting movement and the linear movement of the locking pawl in order to release the locking pawl from the toothing system. The superimposition of the pivoting movement and the linear movement of the locking pawl avoids abrupt and sudden disengagement of the locking pawl from the toothing system, noise development as a result of the contact of the toothing system with the locking pawl being avoided. Furthermore, the locking pawl may be released reliably from the toothing system, such that the brake actuation lever pivots back from an actuated position into a nonactuated position.

In a preferred embodiment of the present invention, the articulation of the locking pawl and the lever is arranged in a guide on the lever holder, the guide being configured as a slot having a first and a second stop. This achieves a situation where the linear movement of the locking pawl follows a predetermined profile, the two stops achieving a situation where the linear movement of the locking pawl is restricted in both directions. The two positions for the parking brake are advantageously defined by the two stops in the slot, the locking pawl engaging into the toothing system in the first position, in order to lock the brake actuation lever to the lever holder, and the locking pawl being out of engagement with the toothing system in the second position, in order to make pivoting possible of the brake actuation lever with regard to the lever holder. As a result, there is reliable fixing of the brake actuation lever on the lever holder, and secondly pivoting of the brake actuation lever with regard to the lever holder is made possible in order to actuate the parking brake.

The first spring element may be advantageously arranged at the articulation of the locking pawl and the lever on the lever holder, as a result of which the spring force of the first spring element acts both on the locking pawl and on the first lever, with the result that the articulation of the locking pawl and the lever is prestressed in the position which is defined by the first stop of the slot, in order to reliably ensure engagement of the locking pawl in the toothing system.

In another preferred embodiment of the present invention, the first lever and the locking pawl are coupled by means of a second spring element. This coupling achieves a situation where the locking pawl is pivoted about the articulation with regard to the first lever. As a result of this relative movement between the locking pawl and the first lever, the locking pawl is prestressed in the direction of the toothing system and is moved into engagement with the toothing system by means of the second spring element, such that the locking pawl continues to be held reliably in the toothing system and locking of the brake actuation lever on the lever holder continues to be ensured.

The locking pawl may be expediently configured as a lever having a first arm and a second arm, an engaging lug which is in engagement with the toothing system being provided on the first arm. A first end of the second spring element may be expediently arranged on the second arm, a second end of the second spring element being provided on that end of the first lever which faces away from the articulation. As a result of this, the relative pivoting of the locking pawl with regard to the first lever continues to be ensured.

The second spring element may be expediently provided as a compression spring, such that the second arm of the locking pawl and the end of the first lever experience a force which drives them apart, as a result of which the pivoting of the locking pawl with regard to the first lever and engagement of the engaging lug in the toothing system continue to be ensured.

The second spring element can alternatively be configured as a leg spring.

The first spring element advantageously may have a spring force which is provided with a different magnitude in comparison with a spring force of the second spring element. Here, the spring force of the first spring element may be expediently greater than the spring force of the second spring element, such that, during pivoting of the brake actuation lever, the locking pawl may be pivoted over the toothing system only counter to the smaller spring force, as a result of which noise development may be avoided during actuation of the parking brake. In order to lock the locking pawl in the toothing system, the two spring forces are added, with the result that the locking pawl is held reliably in the toothing system.

In a further preferred embodiment of the present invention, the release unit may have a second lever, the second lever being in abutting engagement with the first lever. In order to release the locking device, the second lever may be pivoted, such that it slides along the first lever and pivots the latter on the lever holder about a second bearing. Here, the articulation of the first lever and the locking pawl may be displaced on the lever holder, such that the locking pawl experiences a linear movement which releases the locking pawl from the toothing system. At the same time, the locking pawl may be pivoted about the articulation with regard to the first lever by the second spring element and superimposes the linear movement. The movement of the locking pawl which results from the superimposition makes release possible of the locking pawl from the toothing system, in which the locking pawl may be released from the toothing system in such a way that noise development may be avoided between the locking pawl and the toothing system.

In another preferred embodiment of the present invention, the brake actuation lever may be configured as a foot pedal for a foot parking brake. The brake actuation lever can likewise be provided as a hand brake lever for a hand parking brake.

Further advantages and features of the invention will become apparent from the following description and from the dependent claims.

BRIEF DESCRIPTION OF THE DRAWINGS

The invention will be explained in greater detail herein below with reference to a preferred exemplary embodiment of a parking brake according to the present invention and with reference to the attached drawings.

FIG. 1 shows a preferred exemplary embodiment of a parking brake according to the present invention.

DETAILED DESCRIPTION

FIG. 1 shows a preferred exemplary embodiment of a parking brake according to the present invention, in which a brake actuation lever 1 is arranged on a lever holder 2 such that it can pivot about an axis S, the lever holder 2 being fastened to a body of the vehicle.

A coupling unit 3 which couples the brake actuation lever 1 to a brake cable 5 is provided on the brake actuation lever 1, the coupling unit 3 having a hole 4, in which the brake cable 5 is arranged.

The coupling unit 3 can likewise be configured in such a way that a brake linkage can be provided instead of a brake cable 5.

The brake actuation lever 1 has approximately a triangular basic shape, the coupling unit 3 for the brake cable 5 being provided in a first corner 1a of the triangle, and an actuating unit 6, such as a foot pedal 6 or a hand brake lever 6, being provided in a second corner 1b. A first side which connects the first corner 1a to the second corner 1b has a profile which is curved in the direction of the pivot axis S. A second side which connects the first corner 1a to a third corner 1c has, in a central region, a bulge 1d which is oriented outward from the pivot axis S, the bulge 1d having a hole 7, in which rotational means 8 are arranged, in which the pivot axis S is arranged.

A toothing system 9 is arranged on the third side of the brake actuation lever 1 which lies the coupling unit 3, the toothing system 9 having a profile which is curved outward from the pivot axis S and the center point of which coincides with the pivot axis S. The toothing system 9 has two projections 9a, 9b which are arranged so as to fit in corresponding recesses 1f, 1g which are formed on the third side. The toothing system 9 is fastened to the brake actuation lever 1 by means of fastening means 10.

The fastening means 10 can be of various configurations, for example screws or rivets can be provided, and also a clipping means of the toothing system 9 on the brake actuation lever 1.

The toothing system 6 can also be configured in one piece with the brake actuation lever 1.

A locking pawl 11 which is configured as a lever having a first arm 12 and a second arm 13 is arranged pivotably on the lever holder 2. A pivotable articulation 14 of the locking pawl 11 is provided between the first arm 12 and the second arm 13, the first arm 12 and the second arm 13 being connected rigidly to one another.

The pivotable articulation 14 of the locking pawl 11 on the lever holder 2 is provided displaceably in a slot 15, the pivotable articulation 14 being realized by a pivot pin 16 which is guided in the slot 15. The slot 15 has a first stop 17 and a second stop 18 for the pivot pin 16, the first stop 17 being at a smaller spacing from the toothing system 9 than the second stop 18, such that the slot 15 has an extent which extends in a manner which is directed obliquely away from the toothing system 9.

A first spring element 19 which is configured as a compression spring is arranged on the pivotable articulation 14 of the locking pawl 11, a first end of the first spring element 19 being provided on the pivot pin 12 and a second end of the first spring element 19 being supported on or fastened to the lever holder 2.

An engaging lug 20 which can be coupled to the toothing system 9 which is formed on the brake actuation lever 1 is provided on the first arm 12.

A first lever 21 is arranged pivotably in a bearing 22 on the lever holder 2, the bearing 22 defining a first articulation of the first lever 21. An end of the first lever 21 which faces away from the bearing 22 is arranged on the pivot pin 16, such that there is a common bearing 14 on the lever holder 2 for the locking pawl 11 and the first lever 21. The first lever 21 and the locking pawl 11 are coupled to one another by means of a second spring element 23, a first end of the second spring element 23 being fastened to the second arm 13 of the locking pawl 11 and a second end of the second spring element 23 being arranged in the region of the bearing 22. The second spring element 23 is configured as a compression spring. A force which prestresses the second arm 13 in a manner which is oriented away from the bearing 22 of the first lever 21 is brought about between the first lever 21 and the second arm 13 of the locking pawl 11 by means of the second spring element 23, such that the locking pawl 11 is pivoted about the common bearing 14, defining a second articulation of the first lever 21, and the engaging lug 20 which is formed on the first arm 13 is prestressed in the direction of the toothing system 9.

A second lever 24 is arranged on the lever holder 2 such that it can pivot about a further bearing 25, the second lever 24 having a contact section 26 which abuts against the first lever 21. A release cable 27 for pivoting the second lever 24 is arranged at that end of the second lever 24 which faces away from the contact section 26.

During actuation (i.e. during pivoting about the pivot axis S) of the brake actuation lever 1, the toothing system 9 is also pivoted, the locking pawl 11 sliding over the toothing system 9. Here, the locking pawl 11 is pivoted about the articulation 14 which is realized by the pivot pin 16, counter to the spring force of the second spring element 23.

Here, the spring force of the second spring element 23 is provided with a smaller magnitude than the spring force of the first spring element 21, such that, during pivoting of the brake actuation lever 1, the locking pawl 11 is pivoted only counter to the smaller spring force of the second spring element 23, as a result of which noise reduction is achieved.

If the actuation of the brake actuation lever 1 is stopped, the locking pawl 11 latches into the toothing system 9 by way of the engaging lug 20 and locks the brake actuation lever 1 reliably with regard to the lever holder 2, the pivot pin 16 of the articulation 14 of the locking pawl 11 being held on the first stop 17 of the slot 15 by means of the first spring element 19, such that the locking pawl 11 is fixed in the toothing system 9 by means of the engaging lug 20, as a result of the spring force of the first spring element 13 and as a result of the spring force of the second spring element 23.

In order to release the locking unit, the release cable 27 is actuated, the second lever 24 being pivoted about the further bearing 25 and running along the first lever 21 in a sliding manner, such that the first lever 21 is pivoted about the articulation 14. Here, the pivot pin 16 is displaced in the slot 15 counter to the spring force of the first spring element 19 and is pressed against the second stop 18. At the same time, the locking pawl 11 pivots about the pivot pin 16 on account of the spring force of the second spring element 23, such that the linear movement which is provided by the displacement of the pivot pin 16 in the slot 15 is superimposed by the pivoting movement of the locking pawl 11 about the pivot pin 16. As a result, the engaging lug 20 of the locking pawl 7 moves out of engagement with the toothing system 9, with the result that the brake actuation lever 1 is released and can be pivoted about the pivot axis S.

What is claimed is:

1. A parking brake for a vehicle, comprising:
   a brake actuation lever being mounted pivotably on a lever holder;
   a coupling unit coupling a brake cable to the brake actuation lever;
   a locking device having a toothing system and a first end of a locking pawl being prestressed onto the toothing system by means of a first spring element; and
   a release unit for releasing the locking pawl, the release unit having a first lever;
   the locking pawl being pivotably mounted on a first articulation on the first lever, a second articulation on the first lever being coupled to a second end of the locking pawl by a second spring element;
   the first lever being rotatably received on the lever holder;
   the first articulation being displaceably provided in a guide on the lever holder, the guide being configured as a slot.

2. The parking brake as claimed in claim 1 wherein the guide has a first stop and a second stop.

3. The parking brake as claimed in claim 1 wherein the first articulation comprises a projection being received in the slot.

4. The parking brake as claimed in claim 1 wherein the first spring element engages the locking pawl on the first articulation.

5. The parking brake as claimed in claim 1 wherein the locking pawl is prestressed into a turn direction by means of the second spring element.

6. The parking brake as claimed in claim 5 wherein the locking pawl is configured as a lever having a first arm and a second arm, an engaging lug being provided on the first arm and the second spring element being arranged on the second arm.

7. The parking brake as claimed in claim 5 wherein the first lever is arranged pivotably on the lever holder by means of a bearing, the second spring element being arranged in a region of the bearing.

8. The parking brake as claimed in claim 5 wherein the second spring element is selected from a group consisting of a compression spring and a leg spring.

9. The parking brake as claimed in claim 5 wherein the first spring element has a spring force, and the second spring element has a spring force which differs from the spring force of the first spring element.

10. The parking brake as claimed in claim 1 wherein the release unit comprises a second lever.

11. The parking brake as claimed in claim 10 wherein the second lever is arranged pivotably on the lever holder.

12. The parking brake as claimed in claim 10 wherein the second lever is in abutting engagement with the first lever.

13. The parking brake as claimed in claim 1 wherein the first spring element is a compression spring.

14. The parking brake as claimed in claim 1 wherein the brake actuation lever is in engagement with an actuation element selected from the group consisting of a foot pedal for a foot parking brake and a hand brake lever for a hand parking brake.

15. A parking brake for a vehicle, comprising:
   a brake actuation lever being mounted pivotably on a lever holder;
   a coupling unit coupling a brake cable to the brake actuation lever;
   a locking device having a toothing system and a locking pawl being prestressed onto the toothing system by means of a first spring element having a first end and a second end; and a release unit for releasing the locking pawl, the release unit having a first lever;

the locking pawl being pivotably mounted on a first articulation on the first lever;

the first lever being arranged pivotably on the lever holder by being mounted on a second articulation on the lever holder;

the first spring element engaging the lever holder at one of the first end and the second end;

the first spring element contacting the first articulation, the first articulation being on the other of the first end and the second end; and a spring force of the first spring element acting on both the first lever and the locking pawl.

16. The parking brake as claimed in claim 15 wherein the lever holder comprises a guide.

17. The parking brake as claimed in claim 16 wherein the second articulation is displaceably received in the guide.

18. A parking brake for a motor vehicle, comprising:

a lever holder;

a brake actuation lever being pivotably mounted on the lever holder and having a coupling unit for receiving a brake cable;

a locking device having a toothing system arranged on the brake actuation lever and a locking pawl for engaging the toothing system arranged on the brake actuation lever;

a first lever, wherein a first portion of the first lever is rotatably arranged on the lever holder on a first articulation, the locking pawl being rotatably arranged on a second portion of the first lever on a second articulation;

a first spring element prestressing the first lever around the first articulation in an engagement direction onto the toothing; and a second spring element contacting the first articulation, the second spring element prestressing the locking pawl around the second articulation in the engagement direction onto the toothing;

wherein the second articulation is displaceably received in a slot of the lever holder.

19. The parking brake as claimed in claim 18 wherein the locking pawl comprises an engaging lug, the distance from the engaging lug to the second articulation being smaller than the distance between the first articulation and the second articulation.

\* \* \* \* \*